United States Patent
Reith et al.

(10) Patent No.: US 10,935,404 B2
(45) Date of Patent: Mar. 2, 2021

(54) MEMS SENSOR FOR MEASURING AT LEAST ONE MEASURED VARIABLE

(71) Applicant: TrueDyne Sensors AG, Reinach (CH)

(72) Inventors: Patrick Reith, Basel (CH); Christof Huber, Bern (CH); Hagen Feth, Freiburg (DE)

(73) Assignee: TrueDyne Sensors AG, Reinach (CH)

( * ) Notice: Subject to any disclaimer, the term of this patent is extended or adjusted under 35 U.S.C. 154(b) by 343 days.

(21) Appl. No.: 15/771,938

(22) PCT Filed: Sep. 12, 2016

(86) PCT No.: PCT/EP2016/071397
§ 371 (c)(1),
(2) Date: Apr. 27, 2018

(87) PCT Pub. No.: WO2017/071864
PCT Pub. Date: May 4, 2017

(65) Prior Publication Data
US 2018/0348033 A1 Dec. 6, 2018

(30) Foreign Application Priority Data

Oct. 27, 2015 (DE) ...................... 10 2015 118 346.3

(51) Int. Cl.
*G01F 1/84* (2006.01)
*G01N 9/36* (2006.01)
*G01N 11/16* (2006.01)

(52) U.S. Cl.
CPC .......... *G01F 1/8445* (2013.01); *G01F 1/8404* (2013.01); *G01F 1/849* (2013.01);
(Continued)

(58) Field of Classification Search
CPC ...... G01F 1/8445; G01F 1/8404; G01F 1/849; G01F 1/8495; G01N 9/36; G01N 11/16
See application file for complete search history.

(56) References Cited

U.S. PATENT DOCUMENTS

| 5,731,527 A | 3/1998 | Vancleve |
| 8,680,951 B2 * | 3/2014 | Steeneken .......... H03H 9/02433 333/186 |

(Continued)

FOREIGN PATENT DOCUMENTS

| CN | 1353809 A | 6/2002 |
| CN | 101952193 A | 1/2011 |

(Continued)

OTHER PUBLICATIONS

Search Report for German Patent Application No. 10 2015 118 346.3, German Patent Office, dated Jul. 13, 2016, 7 pp.

(Continued)

*Primary Examiner* — David Z Huang
(74) *Attorney, Agent, or Firm* — Kelly J. Smith; Endress+Hauser (USA) Holding Inc.

(57) ABSTRACT

A MEMS sensor for measuring at least one measured variable, especially a density, a flow and/or a viscosity, a flowing fluid, is described, comprising: at least one microfluidic channel having a channel section excitable to execute oscillations; and an exciter system for exciting a desired oscillation mode, causing the channel section to execute oscillations in a predetermined plane of oscillation. The MEMS sensor has improved oscillation characteristics at least in part because the channel section is composed of an anisotropic material, having directionally dependent elasticity and which is spatially oriented such that a modulus of elasticity determinative for a stiffness of the channel section relative to deflections of the channel section perpendicular to the plane of oscillation is greater than a modulus of elasticity determinative for a stiffness of the channel section relative to deflections of the channel section in the plane of oscillation.

8 Claims, 3 Drawing Sheets

(52) U.S. Cl.
CPC ............ *G01F 1/8495* (2013.01); *G01N 9/36* (2013.01); *G01N 11/16* (2013.01)

(56) References Cited

U.S. PATENT DOCUMENTS

| | | |
|---|---|---|
| 2002/0017132 A1 | 2/2002 | McNie et al. |
| 2004/0038426 A1 | 2/2004 | Manalis |
| 2005/0064581 A1 | 3/2005 | Manalis et al. |
| 2006/0037187 A1 | 2/2006 | Sparks et al. |
| 2007/0151335 A1 | 7/2007 | Sparks et al. |
| 2007/0277608 A1 | 12/2007 | Lopatin et al. |
| 2010/0037706 A1 | 2/2010 | Sparks et al. |
| 2010/0242606 A1 | 9/2010 | Kanemoto |

FOREIGN PATENT DOCUMENTS

| | | |
|---|---|---|
| CN | 102037644 A | 4/2011 |
| CN | 103293338 A | 9/2013 |
| CN | 103562689 A | 2/2014 |
| DE | 69713433 T2 | 2/2003 |
| DE | 69936590 T2 | 11/2007 |
| EP | 0547455 A1 | 6/1993 |

OTHER PUBLICATIONS

Search Report for International Patent Application No. PCT/EP2016/071397, WIPO, dated Dec. 14, 2016, 14 pp.

Hopcroft, et al., What is the Young's Modulus of Silicon?, Journal of Microelectromechanical Systems, vol. 19, No. 2, Apr. 2010, 10 pp.

\* cited by examiner

MEMS SENSOR FOR MEASURING AT LEAST ONE MEASURED VARIABLE

CROSS-REFERENCE TO RELATED APPLICATIONS

The present application is related to and claims the priority benefit of German Patent Application No. 10 2015 118 346.3, filed on Oct. 27, 2015 and International Patent Application No. PCT/EP2016/071397 filed on Sep. 12, 2016, the entire contents of which are incorporated herein by reference.

TECHNICAL FIELD

The invention relates to a MEMS sensor for measuring at least one measured variable, especially a density, a flow and/or a viscosity, of a fluid, comprising: at least one microfluidic channel, which has at least one channel section excitable to execute oscillations; and an exciter system for exciting a desired oscillation mode, in the case of which the channel section executes oscillations in a predetermined plane of oscillation.

BACKGROUND

MEMS sensors are micro-electromechanical systems, which are applied in measurements technology for meteorological registering one or more measured variables. MEMS sensors are regularly produced by applying methods common in semiconductor technology, such as e.g. etching processes, oxidation methods, implantation methods, bonding methods and/or coating methods, using one or multi-ply wafers, especially wafers based on silicon.

MEMS sensors for measuring at least one measured variable, especially a density, a flow and/or a viscosity, of a fluid, comprising: a microfluidic channel, which has a channel section excitable to execute oscillations; and an exciter system for exciting a desired oscillation mode, in the case of which the channel section executes oscillations in a predetermined plane of oscillation, are described, for example, in DE10,2008/039045 A1, US 2010/0037706 A1 and US 2002/0194908 A1.

MEMS sensors of the above mentioned kind can be applied for performing various measuring principles.

An example is Coriolis mass flow measurement, which rests on the principle that in a channel section, through which fluid is flowing and which is excited to execute oscillations, Coriolis forces arise, which affect the oscillation form. The resulting oscillation form of the channel section can be registered e.g. by oscillation sensors arranged on an inlet side and on an outlet side of the channel section. In such case, the oscillatory movements registered by the two oscillation sensors have equal frequencies corresponding to the resulting oscillation form. They are, however, phase-shifted relative to one another by a phase shift dependent on the mass flow.

A further example is Coriolis density measurement. Also in this case, at least one channel, through which fluid flows in measurement operation, is applied, which includes at least one channel section excitable to execute oscillations by means of an exciter system. In the case of this measuring principle, the channel section is excited to execute oscillations at a resonant frequency. The resonant frequency depends on the density of the flowing fluid and can, thus, be taken into consideration for determining the density.

In the case of MEMS sensors having at least one channel section excitable to execute oscillations in measurement operation, there is the problem that channel sections excitable to execute oscillations can have different oscillation modes. In such case, there is the danger that the desired oscillation mode excited in measurement operation can superimpose on other oscillation modes hereinafter referred to as disturbance modes. These disturbance modes can be caused e.g. by disturbance sources, such as e.g. vibrations at the location of use, and can degrade the accuracy of measurement of these sensors. Especially critical are disturbance modes, which correspond to eigenoscillation modes of the channel section, since these can be excited with comparatively little energy input.

This problem occurs also in the case of conventional Coriolis mass flow measurement devices with measuring tubes excitable to execute oscillations.

In connection with conventional Coriolis mass flow measurement devices with measuring tubes excitable to execute oscillations, U.S. Pat. No. 5,731,527 A1 describes suppressing disturbance modes by applying, extending on mutually opposite, external sides of the measuring tubes in parallel with the longitudinal axis of the measuring tube, elongated strips of a fiber reinforced, composite material, which bring about a stiffening of the measuring tubes dependent on the position the strips and the orientation of the fibers.

This solution is, however, not directly transferable to MEMS sensors. For this, fiber reinforced composite materials would have to be found, which could be applied externally on microfluidic channels of MEMS sensors. Moreover, a method for application of these materials would be needed for producing a connection of fiber reinforced composite material and channel, a connection which could durably withstand the mechanical loadings caused by the oscillations of the channel.

SUMMARY

It is an object of the invention to provide a MEMS sensor, which can serve for measuring at least one measured variable of a flowing fluid and which overcomes the disadvantages of the aforementioned state of the technology.

To this end, the invention resides in a MEMS sensor for measuring at least one measured variable, especially a density, a flow and/or a viscosity, of a fluid, comprising
   at least one microfluidic channel,
      which has at least one channel section excitable to execute oscillations, and
   an exciter system for exciting a desired oscillation mode, in the case of which the channel section executes oscillations in a predetermined plane of oscillation,
characterized in that the channel section is composed of an anisotropic material, which has directionally dependent elasticity and which is spatially oriented in such a manner that a modulus of elasticity determinative for a stiffness of the channel section relative to deflections of the channel section perpendicular to the plane of oscillation is greater than a modulus of elasticity determinative for a stiffness of the channel section relative to deflections of the channel section in the plane of oscillation.

A first further development provides that
      the channel section is composed of silicon or a material based on silicon, especially a material in the form of doped silicon, and
      a crystal structure of the material is oriented in such a manner that the (110) direction of the crystal structure extends in parallel with a longitudinal axis of the channel section, and the (001) direction of the crystal structure extends in parallel with a surface normal to the plane of oscillation.

A preferred embodiment provides that the channel section has, perpendicular to the plane of oscillation and perpendicular to its longitudinal axis, a height, which is greater than its breadth perpendicular to the height and perpendicular to its longitudinal axis.

A first variant provides that there are provided, arranged on two mutually spaced supports, two mutually parallel channels, each of which includes a channel section suspended between the two supports, the two channel sections extend mutually parallel, and the exciter system is embodied in such a manner that it excites the two channel sections in measurement operation, in each case, to execute oscillations, especially opposite phase oscillations, in the predetermined plane of oscillation.

A second variant provides that the channel is arranged on two mutually spaced supports and is a U-shaped channel, which includes two mutually parallel and mutually spaced channel segments and a channel segment connecting the two parallel channel segments together, and whose channel sections are formed, in each case, by a channel section of one of the two parallel channel segments suspended between the two supports, and the exciter system is embodied in such a manner that it excites the two channel sections in measurement operation, in each case, to execute oscillations, especially opposite phase oscillations, in the predetermined plane of oscillation.

Another embodiment provides that the channel has an inlet, via which the fluid enters in measurement operation into the channel, and the channel has an outlet, via which the fluid leaves the channel in measurement operation after flowing through the channel.

Another embodiment provides that the exciter system is embodied in such a manner that it excites the desired oscillation mode in measurement operation, and a measuring system is provided, which is embodied in such a manner that it metrologically registers in measurement operation at least one property of the resulting oscillation form of the channel section dependent on a property, especially a mass flow, a density or a viscosity, of the fluid flowing in measurement operation through the channel and determines therefrom the associated measured variable.

Additionally, the invention resides in a method for manufacturing the MEMS sensors of the invention, characterized in that, from a first wafer of the anisotropic material, cross-sectionally U-shaped profiles are produced, which, in each case, form three of the four channel walls of a channel and have in plan view the course of the channels to be manufactured, and a second wafer is connected in such a manner with the first wafer that the second wafer outwardly seals the interior of the U-shaped profiles, and the second wafer is removed except for its regions forming the fourth channel walls, wherein the first and second wafers contain the anisotropic material, in each case, in a spatial orientation, which corresponds to the orientation of the material in the channel sections.

A further development of this method is characterized in that the wafers are composed of silicon or a material based on silicon, especially a material in the form of doped silicon, a surface normal on the first and the second wafer, in each case, extends in parallel with the (100) direction of the crystal structure of the material, and the wafers in the case of manufacture of the channels are oriented in such a manner that the longitudinal axes of the channel sections extend in parallel with the (110) direction of the crystal structure.

MEMS sensors of the invention have the advantage that via the orientation of the material a disturbance mode suppressing increasing of the stiffness of the channel section relative to deflections perpendicular to the plane of oscillation x-y and/or a measuring sensitivity increasing lowering of the stiffness of the channel section relative to deflections in parallel with the plane of oscillation are/is effected.

BRIEF DESCRIPTION OF THE DRAWING

The invention and other advantages will now be explained in greater detail based on the figures of the drawing, in which three examples of embodiments are shown; equal parts are provided in the figures with equal reference characters. The figures of the drawing show as follows.

DETAILED DESCRIPTION

Figure 1:
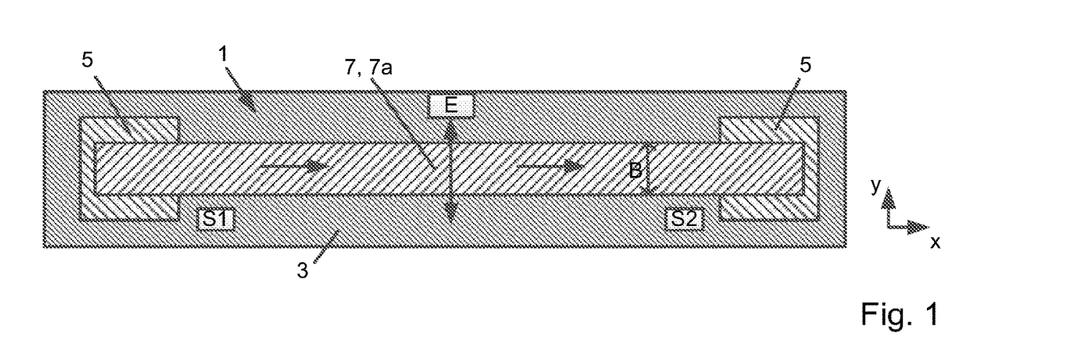
FIG. 1 shows a plan view of a MEMS sensor with one channel.
Figure 2:
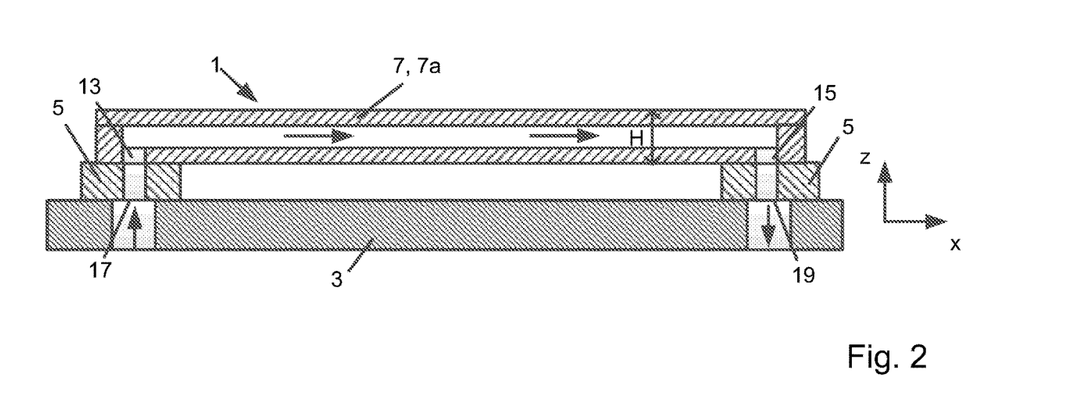
FIG. 2 shows a sectional view of the MEMS sensor of FIG. 1.
Figure 3:
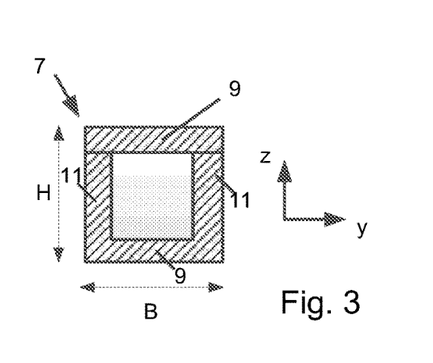
FIG. 3 shows a cross-section of a channel section of FIG. 1.

FIG. 1 shows a plan view of a first example of an embodiment of a MEMS sensor of the invention for measuring at least one measured variable of a flowing fluid, especially a liquid or a gas. FIG. 2 shows a sectional view of the MEMS sensor of FIG. 1. The MEMS sensor includes a microfluidic channel 1, which is arranged on two supports 5 arranged on a foundation 3. Channel 1 includes, suspended between the two supports 5, a channel section 7, which is excitable by means of an exciter system E (illustrated here only schematically) to execute oscillations. FIG. 3 shows a cross-section of the channel section 7 of FIG. 1.

For example, electrostatic, piezoelectric or magnetic exciter systems E can be applied for oscillation excitement. Corresponding exciter systems are known to those skilled in the art and are, consequently, not described here in detail. The exciter system E is embodied in such a manner that it excites a desired oscillation mode, in the case of which the channel section 7 executes oscillations in a predetermined plane of oscillation x-y, indicated here by the spatial directions x and y.

The desired oscillation mode corresponds preferably to an eigenoscillation mode of the channel section 7. In that case, the exciter system E in the illustrated example of an embodiment is preferably embodied in such a manner that it effects a deflection of the channel section 7 to both sides of its longitudinal axis extending here in parallel with spatial direction x, wherein the greatest defection amplitudes preferably occur in the region of the half-length of the channel section 7 and from the half-length of the channel section 7 lessen in the direction of the two affixed ends of the channel section 7. This desired oscillation mode is displayed in FIG. 1 by a double arrow extending perpendicularly to the longitudinal axis of the channel 1. In such case, the channel section 7 includes preferably two mutually opposite channel walls 9 extending in parallel with the plane of oscillation x-y and two mutually opposite channel walls 11 extending perpendicularly to the plane of oscillation x-y. In the case of this orientation of the channel walls 9, 11, the channel section 7 has, due to its form, besides the eigenoscillation mode applied here as desired oscillation mode, another eigenoscillation mode, in the case of which the channel section 7 executes essentially equally formed oscillations in a desired oscillation mode extending perpendicularly to the plane of oscillation x-y, here the plane of oscillation x-z defined by the spatial directions x and z.

The channel section 7 shown in FIG. 3 cross-sectionally includes, e.g., a cross-sectionally square, basic form, in the case of which its height H extending perpendicularly to the longitudinal axis of the channel section 7 and perpendicularly to the plane of oscillation x-y equals its breadth B extending perpendicularly to the height H and to the longitudinal axis of the channel section 7.

Channel 1 has preferably a breadth B of at least one, preferably multiple, 100 µm and a height H of at least one, preferably multiple, 100 µm. The channel walls 9, 11 have, for example, a wall thickness in the order of magnitude of 10 µm to 100 µm. Preferably, the wall thickness lies in the range of 20 µm to 60 µm.

In the case of the example of an embodiment illustrated here, the oppositely lying ends of the channel 1 are affixed to the two supports 5. Alternatively, naturally also other forms of arrangement and/or securement of the channel 1 and/or of the channel section 7 can be provided, which are embodied in such a manner that a desired oscillation mode can be excited, in the case of which the channel section 7 executes oscillations in a predetermined plane of oscillation.

Channel 1 includes an inlet 13, via which fluid can enter into the channel 1, and an outlet 15, via which the fluid can escape from the channel 1. In the illustrated example of an embodiment, the inlet 13 is fed via a supply line 17 passing through the foundation 3 and one of the two supports 5. The fluid emerging outlet side from the channel 1 is removed via a drain line 19 passing through the foundation 3 and the other support 5. In such case, the fluid flows through the channel 1 in the flow direction indicated by arrows in FIGS. 1 and 2.

If the channel section 7, through which the fluid flows, is excited in measurement operation by means of the exciter system E to execute oscillations of the desired oscillation mode, then there arise in the channel section 7, through which fluid is flowing and which is excited to execute oscillations, Coriolis forces, which affect the resulting oscillation form of the channel section 7.

The MEMS sensor includes a measuring system, which is embodied in such a manner that it metrologically registers in measurement operation at least one property of the resulting oscillation form of the channel section 7 dependent on a measured variable to be measured and determines therefrom the particular measured variable. For measuring one or more measured variables of the flowing fluid, different measuring systems for performing corresponding measuring methods known from the state of the art, such as e.g. the Coriolis mass flow measurement and/or the Coriolis density measurement mentioned above, can be applied. The measuring system shown here only as one possible example includes two oscillation sensors S1, S2, of which one is arranged inlet side and one outlet side of the channel section 7. In the case of this embodiment, the oscillations registered by the two oscillation sensors S1, S2 have agreeing frequencies corresponding to the resulting oscillation form and phase-shifted relative to one another by a phase shift dependent on the mass flow. Oscillation sensors usable for this, e.g. capacitive, piezoelectric or magnetic oscillation sensors, are known from the state of the art and are, consequently, not described in detail here.

The MEMS sensor can be applied e.g. for mass flow measurement, in that the phase shift dependent on the mass flow is determined by means of a measurement circuit (not shown) connected to the oscillation sensors S1, S2 and, from such determination, the mass flow is derived. Alternatively or supplementally to this, the MEMS sensor can be applied for Coriolis density measurement. In such case, the channel section 7 is excited by means of the exciter system E to execute oscillations at a resonant frequency, the resonant frequency dependent on the density is ascertained by means of a measurement circuit (not shown) connected to the oscillation sensors S1, S2 and, from such ascertainment, the density of the fluid is determined.

If a pressure drop along the channel 1 is known, the MEMS sensor can alternatively or supplementally be applied for measuring a viscosity of the fluid. The pressure drop corresponds to a difference between an inlet side and an outlet side pressure acting in the channel 1. The pressure drop can be registered metrologically e.g. by means of a pressure sensor (not shown) connected in front of the channel 1 and a pressure sensor (not shown) connected following the channel 1. Corresponding pressure sensors are described, for example, in US 2002/0194908 A1. The pressure drop is dependent according to the law of Hagen-Poiseuille on the product of the mass flow through the channel 1 and the kinematic viscosity of the fluid flowing through the channel 1. Correspondingly, in the case of known pressure drop, the kinematic viscosity of the fluid can be determined based on the mass flow measured with the MEMS sensor.

Alternatively, the viscosity can, however, also be determined based on an oscillation damping dependent on the viscosity. A measuring method suitable for this is described e.g. in EP01158289 B1.

According to the invention, channel section 7 is composed of an anisotropic material with directionally dependent elasticity. The anisotropic material is spatially oriented in such a manner that a modulus of elasticity determinative for a stiffness of the channel section 7 relative to deflections of the channel section 7 perpendicular to the plane of oscillation x-y is greater than a modulus of elasticity determinative for a stiffness of the channel section 7 relative to deflections of the channel section 7 in the plane of oscillation x-y. In such case, the orientation of the material is chosen to increase the stiffness of the channel section 7 relative to deflections perpendicular to the plane of oscillation x-y and/or to lower such relative to deflections in parallel with the plane of oscillation x-y.

The orientation of the invention of the material of the channel section 7 offers the advantage that it effects a frequency separation between the eigenfrequencies of the eigenoscillation of the channel section 7 used as desired oscillation mode and the additional eigenoscillation mode extending in the plane of oscillation x-z perpendicular to the plane of oscillation x-y of the desired oscillation mode. While these two eigenfrequencies would be the same in the case of a cross-sectionally square channel section of an isotropic material, there is in the case of an equally shaped channel section 7 with the orientation of the invention of anisotropic material a frequency separation, wherein the eigenfrequency of the desired oscillation mode is less than that of the otherwise equally formed, additional eigenoscillation mode extending perpendicular thereto.

A lower stiffness of the channel section 7 for deflections in the plane of oscillation x-y offers the advantages that the eigenfrequency of the desired oscillation mode is lowered thereby, and that the MEMS sensor has a higher measuring sensitivity.

The latter is especially the case, since the Coriolis forces arising in measurement operation in the case of lower stiffness of the channel section 7 relative to deflections in the plane of oscillation x-y have an increased influence on the resulting oscillation form.

These advantages are greater, the greater the reduction of the stiffness of the channel section 7 effected relative to deflections in the plane of oscillation x-y obtained via the orientation of the material.

In the same way as via a lowering of the stiffness of the channel section 7 relative to oscillations in the plane of oscillation x-y of the desired oscillation mode, naturally also via an increasing of the stiffness of the channel section 7 relative to oscillations perpendicular to the plane of oscillation x-y of the desired oscillation mode, a frequency separation between the two eigenfrequencies can be achieved. Such a frequency separation is advantageous as regards the suppressing of disturbance modes with oscillation fractions perpendicular to the plane of oscillation x-y of the desired oscillation mode. The greater the frequency separation, the lower is the danger that disturbance modes will be excited.

Moreover, influences of disturbance modes due to the different eigenfrequencies can be more easily detected and filtered out in the deriving of the measurement signals.

Suited as anisotropic material with directionally dependent elasticity is especially a crystalline material with a directionally dependent elasticity dependent on its crystal structure, such as e.g. silicon or materials based on silicon, such as e.g. doped silicon. The directional dependence of the elasticity can be registered quantitatively, for example, by measurements of the modulus of elasticity of the material in different spatial directions, in each case, related to the orientation of the crystal structure. In such case, the orientation of the crystal structure is preferably given by the corresponding Miller indices.

If the channel section 7 is of silicon or a material based on silicon, then its crystal structure has preferably an orientation, in the case of which the [110] direction of the crystal structure extends in parallel with the longitudinal axis of the channel section 7 and the [001] direction of the crystal structure extends perpendicular to the plane of oscillation x-y. In the case of this orientation of the material, the modulus of elasticity of silicon effective in the [110] direction of the crystal structure is decisive for the stiffness of the channel section 7 relative to deflections perpendicular to the plane of oscillation x-y. This modulus of elasticity lies in the order of magnitude of 169 GPa. In contrast, the stiffness of the channel section 7 relative to deflections in parallel with the plane of oscillation x-y is decisively determined by the significantly lower modulus of elasticity in the [100] direction of the crystal structure, which lies in the order of magnitude of 130 GPa.

Figure 4:
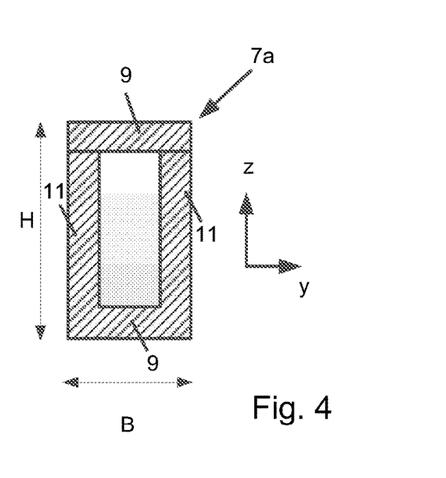
FIG. 4 shows an alternative cross-section of a channel section of FIG. 1.

In addition to the improvements effected by the orientation of the invention of the material of the channel section 7, the oscillation characteristics of the channel section 7 can be still further improved via the formation of the channel section 7. In an especially preferred formation, the channel section 7a is embodied in such a manner that its height H extending perpendicular to the plane of oscillation x-y is greater than its breadth B extending in parallel with the plane of oscillation x-y and perpendicular to its longitudinal axis. FIG. 4 shows a cross-section of such a channel section 7a. In such case, the channel section 7a can have, for example, a breadth B in the order of magnitude of 150 μm and a height H in the order of magnitude of 300 μm. By this formation, an additional increasing of the ratio of the stiffness of the channel section 7a for deflections perpendicular to the plane of oscillation x-y of the desired oscillation mode to the stiffness of the channel section 7a for deflections in the plane of oscillation x-y as well as an increasing of the frequency separation between the two eigenfrequencies associated therewith are effected.

The above explained example of the invention involving a single channel 1 with a single channel section 7, 7a excitable to execute oscillations is applicable completely analogously also in the case of other MEMS sensors having at least one microfluidic channel, which has at least one channel section, which is excitable by means of an exciter system for exciting a desired oscillation mode for executing oscillations in a predetermined plane of oscillation. Examples include MEMS sensors with two or more channels, especially channels connected for parallel or in series flow, of which at least one has at least one channel section formed in the manner described above in connection with the channel section 7, 7a. The invention is not limited to MEMS sensors with one or more straight channels, but, instead, can be analogously applied also in connection with channels, which are not straight. Examples of this are U-shaped, v-shaped or Ω-shaped channels.

Figure 5:
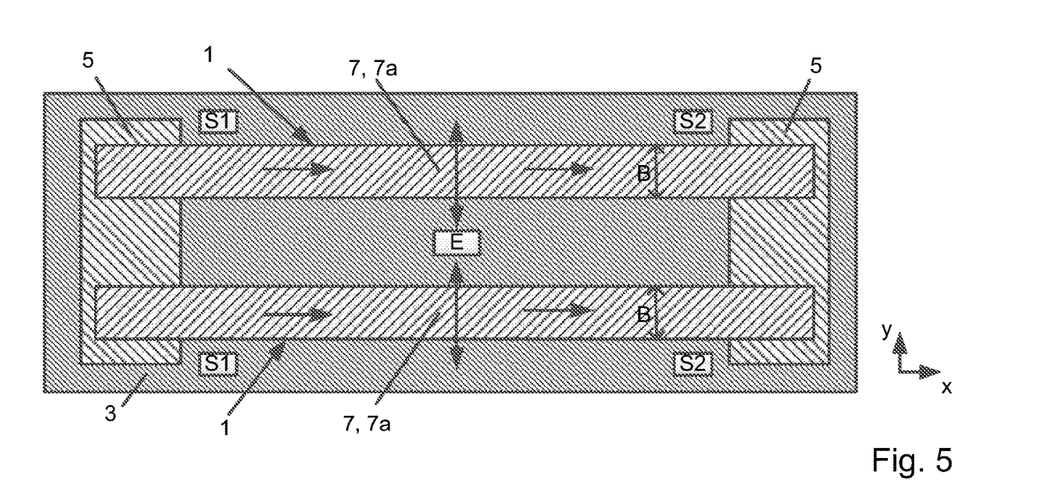
FIG. 5 shows a plan view of a MEMS sensor with two channels.

FIG. 5 shows an example of an embodiment, which differs from the example of an embodiment described based on FIGS. 1 to 4 only in that two mutually parallel channels 1 are provided, through which the fluid flows in parallel and each of which has a channel section 7, 7a excitable to execute oscillations in the predetermined plane of oscillation x-y. The channels 1 and their channel sections 7, 7a are the same as illustrated in FIG. 1, so that, insofar, reference is made to the above explanations.

The desired oscillations modes correspond to the desired oscillation mode described based on the preceding example of an embodiment, wherein the exciting of the two channel sections 7, 7a preferably occurs with opposite phase.

Figure 6:
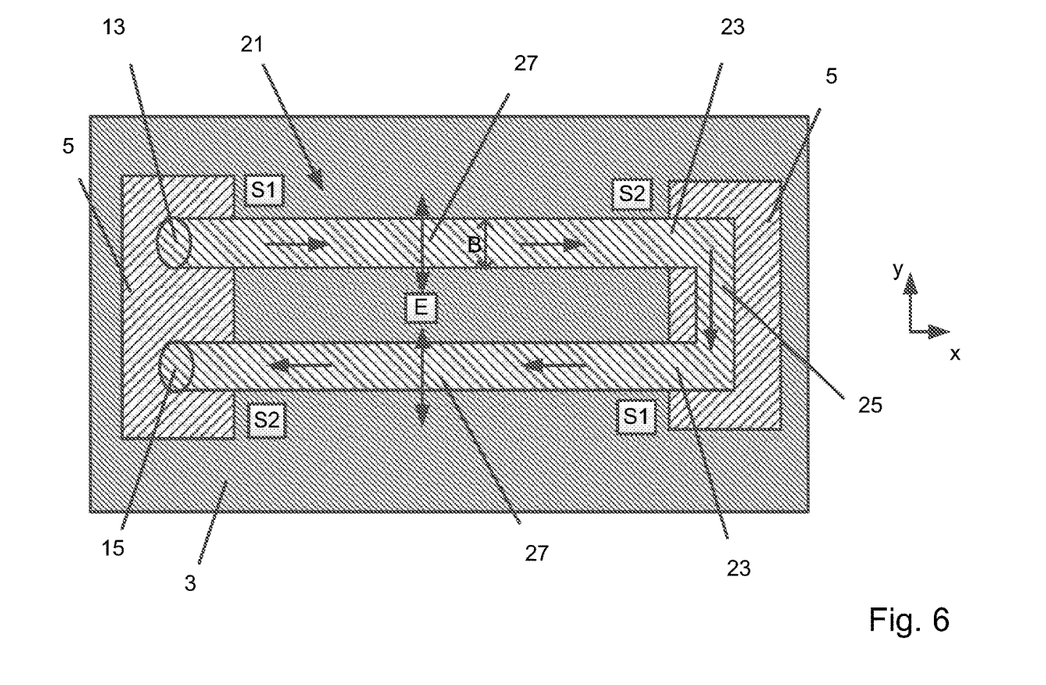
FIG. 6 shows a plan view of a MEMS sensor with a U-shaped channel.
Figure 7:
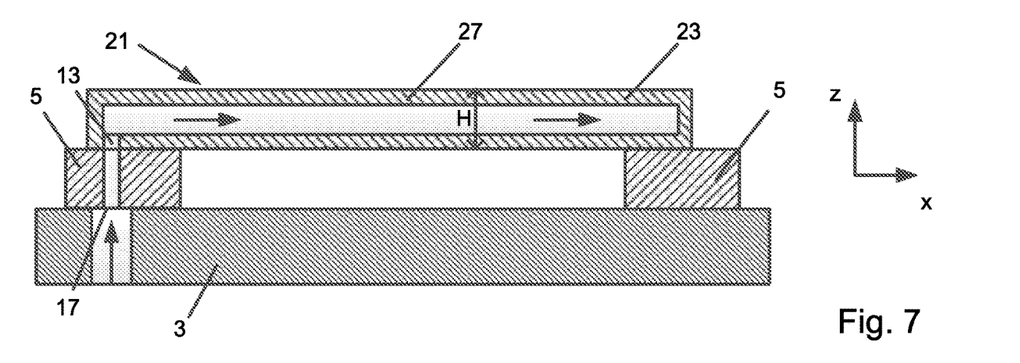
FIG. 7 shows a sectional view of the MEMS sensor of FIG. 6.

FIG. 6 shows a plan view of an example of an embodiment of a MEMS sensor of the invention with a U-shaped channel 21. FIG. 7 shows a sectional view of the MEMS sensor of FIG. 6. The U-shaped channel 21 includes two mutually parallel, mutually spaced, channel segments 23 and a channel segment 25 connecting the two parallel channel segments 23 together. The channel 21 is arranged on two supports 5 arranged on a foundation 3. The first support 5 bears the unconnected ends of the two parallel channel segments 23 comprising the inlet 13 and the outlet 15. The second support 5 is spaced from the first support 5 in the longitudinal direction of the parallel channel segments 23 and bears a region of the two parallel channel segments 23 facing the channel segment 25 connecting the two parallel channel segments 23 together. In the illustrated example of an embodiment, the inlet 13 is supplied via a supply line 17 passing through the foundation 3 and the first support 5 and the fluid leaving on the outlet side from the channel 21 is removed via a drain line 19 passing through the foundation 3 and the first support 5. In such case, the fluid flows through the channel 1 in the flow direction indicated by arrows in FIGS. 6 and 7.

Each of the two parallel channel segments 23 includes a channel section 27, which is suspended between the two supports 5 and which can be caused to oscillate in a plane of oscillation x-y indicated by the coordinates x and y in FIG. 6 by means of an exciter system E illustrated here only schematically. The plane of oscillation x-y corresponds to the plane defined by the two parallel channel segments 23. The exciter system E is preferably embodied in such a manner that it causes the two channel sections 27 to oscillate, preferably with opposite phase, in the plane of oscillation x-y in FIG. 6, as indicated by the double arrows, in the case of which the channel sections 27 are deflected perpendicularly to their longitudinal axes.

In the case of this example of an embodiment, the channel segments 23 including their channel section 27 excitable to execute oscillations are preferably both embodied in the manner described above based on FIGS. 1 to 4 for the channel 1 and its channel section 7, 7a, so that reference is made to the above explanations for such details.

The manufacture of MEMS sensors of the inventions is preferably pursued in such a manner that from a first wafer of the anisotropic material cross-sectionally U-shaped profiles are produced, which have in plan view the course corresponding to the desired channel form of the channels 1, 21 to be manufactured, e.g. the straight course of the channels 1 illustrated in FIGS. 1 and 5 or the U-shaped course of the channel 21 illustrated in FIG. 6. Applied for manufacturing the u-profiles are preferably anisotropic etching methods, such as e.g. the deep reactive ion etching (DRIE) method.

As evident from FIGS. 3 and 4, each U-shaped profile forms three of the four channel walls 9, 11 of its channel 1, 21. For manufacturing the fourth channel walls 9 of the channels 1, 21 not provided by the U-shaped profile, a second wafer is connected with the first wafer in such a manner that it seals the interior of the U-shaped profiles from the exterior. This connection can be produced e.g. by a bonding method, e.g. by silicon direct bonding. Then, the second wafer is removed except for its regions forming the fourth channel walls 9. Also in this case, preferably an anisotropic etching method, such as e.g. the deep reactive ion etching (DRIE) method, is applied.

Both wafers contain the material in a spatial orientation corresponding to the orientation of the material in the channel section 7, 7a, or in the channel sections 27, as the case may be.

Figures 8, 9:
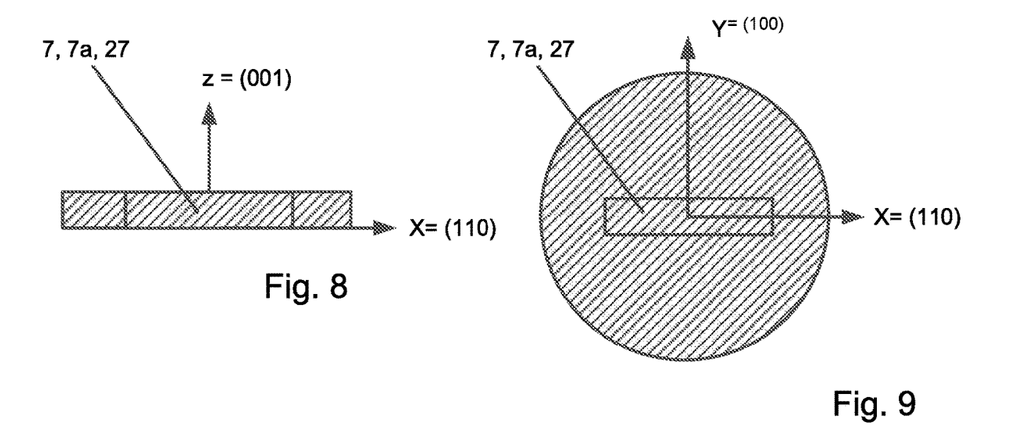
FIG. 8 shows a sectional view of a (001) silicon wafer, in the case of which the orientation of a channel section of FIGS. 1 and 5 or 6 is shown schematically relative to the orientation of the crystal structure of the wafer.
FIG. 9 shows plan view of the wafer of FIG. 8.

For manufacturing the channels 1, 21 of the MEMS sensors illustrated in FIGS. 1, 5 and 6, e.g. two silicon wafers can be used, which contain silicon in a spatial orientation, in the case of which the surface normal to the wafer extends in parallel with the (001) direction of the crystal structure. For manufacturing the channels 1, or 21, as the case may be, these wafers are oriented in such a manner that the longitudinal axes of the channel sections 7, 7a, or the longitudinal axes of the two channel sections 27, as the case may be, extend in parallel with the (110) direction of the silicon wafer. FIG. 8 shows, for this, a sectional view of a (001) silicon wafer and FIG. 9 a plan view of this wafer, in which, in each case, the orientation of a channel section 7, 7a, or 27, in the coordinate system used in FIGS. 1 and 5, or 6, is shown schematically relative to the orientation of the crystal structure.

The described manufacturing processes are preferably executed with wafer bonding, wherein from the appropriately directed, two wafers, multiple channels 1, 21 are produced simultaneously.

LIST OF REFERENCE CHARACTERS 1 channel
3 foundation
5 support
5 channel section
7 channel wall in parallel with the plane of oscillation
9 channel walls perpendicular to the plane of oscillation
11 inlet
15 outlet
17 supply line
19 drain line
21 channel
23 channel segment
25 channel segment
27 channel section

The invention claimed is:

1. A MEMS sensor for measuring at least one measured variable, including a density, a flow and/or a viscosity of a fluid, comprising:
   a first microfluidic channel having a longitudinal axis and a first channel section excitable to execute oscillations; and
   an exciter configured to excite an oscillation mode effecting the first channel section such that the first channel section executes oscillations in a predetermined plane of oscillation,
   wherein the first channel section is composed of an anisotropic material, which has directionally dependent elasticity and which is spatially oriented such that a first modulus of elasticity determinative of a stiffness of the first channel section relative to deflections of the first channel section perpendicular to the plane of oscillation is greater than a second modulus of elasticity determinative of a stiffness of the first channel section relative to deflections of the first channel section in the plane of oscillation,
   wherein via the orientation of the material a disturbance mode is suppressed by increasing of the stiffness of the channel section relative to deflections perpendicular to the plane of oscillation, or a measuring sensitivity is increased by lowering of the stiffness of the channel section relative to deflections in parallel with the plane of oscillation.

2. The MEMS sensor of claim 1, wherein the anisotropic material is a silicon or a material based on silicon, and wherein a crystal structure of the anisotropic material is oriented such that the direction of the crystal structure extends in parallel with the longitudinal axis of the first channel section and such that the direction of the crystal structure extends in parallel with a surface normal to the plane of oscillation.

3. The MEMS sensor of claim 2, wherein the anisotropic material is a doped silicon.

4. The MEMS sensor of claim 1, wherein the first channel section has, perpendicular to the plane of oscillation and perpendicular to the longitudinal axis, a height that is greater than its width perpendicular to the height and perpendicular to the longitudinal axis.

5. The MEMS sensor of claim 1, further comprising a second microfluidic channel arranged mutually parallel to the first channel and including a second channel section excitable to execute oscillations, each of the first channel and the second channel disposed on two mutually spaced supports, wherein the first channel section and the second channel section are suspended between the two supports and are composed of the anisotropic material, and wherein the exciter system is adapted to excite the first channel and the second channel in measurement operation to execute oscillations in the predetermined plane of oscillation.

6. The MEMS sensor of claim 1, wherein the first channel is a U-shaped channel arranged on two mutually spaced supports, the first channel including a first channel segment and a second channel segment, mutually parallel and mutually spaced, and including a third channel segment connecting the first and second channel segments, wherein the first channel segment includes the first channel section and the second channel segment includes a second channel section, each suspended between the two supports and composed of the anisotropic material, and wherein the exciter system is embodied to excite the first and second channel sections in measurement operation to execute opposite phase oscillations in the predetermined plane of oscillation.

7. The MEMS sensor of claim 1, wherein the first channel has an inlet, via which the fluid enters into the first channel, and an outlet via which the fluid exits the first channel after flowing through the channel in measurement operation.

8. The MEMS sensor of claim 1, further comprising a measurement system configured to metrologically register at least one property of the oscillations of the first channel section dependent on a physical property of the fluid flowing through the channel in measurement operation and to determine therefrom an associated measured variable, wherein the physical property is a mass flow, a density and/or a viscosity, and wherein the exciter system is embodied to excite the desired oscillation mode in measurement operation.

* * * * *